(12) United States Patent
Shi et al.

(10) Patent No.: US 12,118,316 B2
(45) Date of Patent: Oct. 15, 2024

(54) SENTIMENT SCORING FOR REMOTE COMMUNICATION SESSIONS

(71) Applicant: Zoom Video Communications, Inc., San Jose, CA (US)

(72) Inventors: Yipeng Shi, Cambridge, MA (US); Peng Su, Shoreline, WA (US); Junqing Wang, Hangzhou (CN)

(73) Assignee: Zoom Video Communications, Inc., San Jose, CA (US)

( * ) Notice: Subject to any disclaimer, the term of this patent is extended or adjusted under 35 U.S.C. 154(b) by 182 days.

(21) Appl. No.: 17/712,040

(22) Filed: Apr. 1, 2022

(65) Prior Publication Data

US 2023/0244874 A1 Aug. 3, 2023

(30) Foreign Application Priority Data

Jan. 20, 2022 (CN) .......................... 202220158738.0

(51) Int. Cl.
*G06F 40/30* (2020.01)
*G06Q 30/0201* (2023.01)
(Continued)

(52) U.S. Cl.
CPC ......... *G06F 40/30* (2020.01); *G06Q 30/0201* (2013.01); *G10L 17/00* (2013.01); *H04L 12/1831* (2013.01)

(58) Field of Classification Search
CPC .......... G06F 3/16; G06F 16/904; G06F 17/18; G06F 40/253; G06F 40/279; G06F 40/284; G06F 40/30; G06F 40/35; G06F 40/56; G06F 16/288; G06F 16/353; G06F 16/90344; G06F 17/10; G06F 40/10;
(Continued)

(56) References Cited

U.S. PATENT DOCUMENTS 9,563,622 B1 * 2/2017 Anderson ............. G06F 16/353
9,812,151 B1 * 11/2017 Amini ..................... G06T 13/40
(Continued)

OTHER PUBLICATIONS

International Search Report and Written Opinion mailed on Apr. 5, 2023 in corresponding PCT Application No. PCT/US2023/011244.
(Continued)

*Primary Examiner* — Gerald Gauthier
(74) *Attorney, Agent, or Firm* — Young Basile Hanlon & MacFarlane, P.C.

(57) ABSTRACT

Methods and systems provide for presenting sentiment scores within a communication session. In one embodiment, the system connects to a communication session with a number of participants; receives a transcript of a conversation between the participants produced during the communication session; extracts, from the transcript, utterances including one or more sentences spoken by the participants; identifies a subset of the utterances spoken by a subset of the participants associated with a prespecified organization; for each utterance, determines a word sentiment score for each word in the utterance, and determines an utterance sentiment score based on the word sentiment scores; determines an overall sentiment score for the conversation based on the utterance sentiment scores; and presenting, to one or more client devices, at least the overall sentiment score for the conversation.

20 Claims, 8 Drawing Sheets

(51) Int. Cl.
*G10L 17/00* (2013.01)
*H04L 12/18* (2006.01)

(58) Field of Classification Search
CPC .... G06F 40/205; G06F 40/242; G06F 40/295; G06N 20/20; G06Q 10/04; G06Q 10/107; G06Q 30/01; G06Q 30/016; G06Q 30/0201; G06Q 30/0282; G06Q 10/0635; G06Q 10/06398; G06T 13/40; G06V 20/40; G10L 15/1822; G10L 15/22; G10L 15/26; G10L 15/30; G10L 17/00; G10L 25/63; H04L 12/1831; H04L 51/52; H04L 51/063; H04L 51/216; H04M 3/4286; H04M 3/4936; H04N 7/157
See application file for complete search history.

(56) References Cited

U.S. PATENT DOCUMENTS

| | | | | |
|---|---|---|---|---|
| 10,977,667 | B1* | 4/2021 | L'Huillier | G06Q 30/0282 |
| 10,990,760 | B1* | 4/2021 | Monnett | G06F 40/295 |
| 11,062,094 | B2* | 7/2021 | Kieser | G06F 17/18 |
| 11,201,966 | B1* | 12/2021 | Restorff | G06F 40/35 |
| 11,223,800 | B1* | 1/2022 | Kwatra | H04N 7/157 |
| 11,297,183 | B2* | 4/2022 | Gopalan | G06F 40/30 |
| 11,651,314 | B1* | 5/2023 | Tuckfield | G06Q 10/0635 |
| | | | | 705/7.28 |
| 11,714,968 | B2* | 8/2023 | Batra | G06F 40/30 |
| | | | | 704/9 |
| 2013/0124192 | A1* | 5/2013 | Lindmark | G06F 40/253 |
| | | | | 704/E11.001 |
| 2013/0253910 | A1* | 9/2013 | Turner | G06F 40/10 |
| | | | | 704/9 |
| 2015/0073775 | A1* | 3/2015 | Skiba | G06F 17/10 |
| | | | | 704/9 |
| 2016/0042226 | A1 | 2/2016 | Cunico et al. | |
| 2017/0052949 | A1* | 2/2017 | Baldwin | H04L 51/216 |
| 2017/0270099 | A1* | 9/2017 | Gorny | G06F 40/30 |
| 2018/0165582 | A1* | 6/2018 | Cha | H04L 51/52 |
| 2019/0050875 | A1* | 2/2019 | McCord | G06F 40/242 |
| 2019/0052584 | A1* | 2/2019 | Barve | G06Q 10/04 |
| 2019/0347326 | A1* | 11/2019 | Kozhaya | G06F 40/30 |
| 2020/0065868 | A1* | 2/2020 | Garlapati | G06F 3/16 |
| 2020/0089767 | A1* | 3/2020 | Ni | G06Q 30/016 |
| 2020/0327191 | A1* | 10/2020 | Lev-Tov | G06F 40/284 |
| 2021/0005217 | A1* | 1/2021 | Deole | H04M 3/4286 |
| 2021/0151037 | A1* | 5/2021 | Christensen | G10L 15/22 |
| 2021/0158813 | A1* | 5/2021 | Sivasubramanian | |
| | | | | G06Q 10/107 |
| 2021/0201897 | A1* | 7/2021 | Mital | G10L 15/22 |
| 2021/0209306 | A1* | 7/2021 | Kvochko | G06F 40/30 |
| 2021/0209307 | A1* | 7/2021 | Serna | G06F 40/30 |
| 2021/0224487 | A1* | 7/2021 | Morris | G06F 16/288 |
| 2021/0224828 | A1* | 7/2021 | Ogrinz | G06Q 30/0201 |
| 2021/0258424 | A1* | 8/2021 | Brown | G06Q 30/01 |
| 2021/0264909 | A1 | 8/2021 | Reece et al. | |
| 2022/0068462 | A1* | 3/2022 | Dolan | G10L 25/63 |
| 2022/0084542 | A1* | 3/2022 | Ramanjani | G06F 16/904 |
| 2022/0092268 | A1* | 3/2022 | Tassone | G06F 40/30 |
| 2022/0131975 | A1* | 4/2022 | Krishnan | G06N 20/20 |
| 2022/0237386 | A1* | 7/2022 | Cheng | G06F 40/205 |
| 2022/0292125 | A1* | 9/2022 | Mathur | G06V 20/40 |
| 2022/0377035 | A1* | 11/2022 | Shapiro | H04L 51/063 |
| 2023/0169279 | A1* | 6/2023 | Coffing | G06F 40/56 |
| | | | | 704/9 |
| 2023/0169957 | A1* | 6/2023 | Yannam | G10L 15/30 |
| | | | | 704/259 |
| 2023/0169969 | A1* | 6/2023 | Yannam | G10L 15/30 |
| | | | | 704/270 |
| 2023/0196020 | A1* | 6/2023 | Thoniparambil | G06F 40/279 |
| | | | | 704/9 |
| 2023/0244874 | A1* | 8/2023 | Shi | G10L 15/1822 |
| | | | | 704/9 |
| 2023/0367821 | A1* | 11/2023 | Hicklin | G06F 16/90344 |
| 2024/0161027 | A1* | 5/2024 | Silverstein | G06Q 10/06398 |

OTHER PUBLICATIONS

Stappen Lukas et al: "Department: Affective Computing and Sentiment Analysis Sentiment Analysis and Topic Recognition in Video Transcriptions", IEEE Intelligent Systems, Mar. 2021, vol. 36, No. 2, IEEE (IF: 4.410)., Mar. 1, 2021 (Mar. 1, 2021), XP093035388, Retrieved from the Internet: URL:https://sentic.net/sentiment-analysis-and-topic-recognition-in-video-transcriptions.pdf> pp. 3-6.

Jokitulppo Matti: "Real-time sentiment analysis of video calls", Mar. 17, 2019 (Mar. 17, 2019), XP093035377, Retrieved from the Internet: URL:https://aaltodoc.aalto.fi/bitstream/handle/123456789/37860/master_Jokitulppo_Matti_2019.pdf?sequence=1&isAllowed=y [retrieved on Mar. 28, 2023] Sections 3 and 4.2.

* cited by examiner

RECORDINGS

YOUR RECORDINGS · ALL RECORDINGS · PLAYLISTS

NOV 19, 2020 - NOV 18, 2021

Q SEARCH BY TOPIC    ADVANCED FILTERS ∨

| TOPIC | | ACCOUNT | PARTICIPANTS | STAGE AT CONVERSATION | SCORE | SENTIMENT |
|---|---|---|---|---|---|---|
| ZOOM & COMPANYNAME MONTHLY — 34 MINS | AM | HONDA | 🟦🟦🟦 | 7. CLOSED WON | 7.9 | 80 |
| ZOOM & COMPANYNAME KICKOFF — 60 MINS | 23 PM | STANFORD UNIVERSITY | 🟦🟦🟦+4 | 8. CLOSED LOST | 7.6 | 73 |
| TWENTY DEAL CLOSING — 45 MINS | 32 PM | TWENTY | 🟦🟦 | 2. DISCOVERY | 7.3 | - |
| ZOOM & COMPANYNAME FOLLOWUP — 60 MINS | 30 PM | HSBC | 🟦🟦🟦 | 7. CLOSED WON | - | 52 |
| ZOOM + COMPANYNAME MONTHLY S... — 60 MINS | 19 PM | J.P.MORGAN | 🟦🟦🟦 | 7. CLOSED WON | 7.9 | 80 |
| COMPANYNAME FOLLOWUP — 60 MINS | 15 PM | AMAZON | 🟦🟦🟦 | 7. CLOSED WON | 7.6 | 73 |

Sidebar: SALES CENTER · DASHBOARD · RECORDINGS · DEALS · COACHING · ANALYTICS · › ADMINISTRATION AND SETTINGS Top bar: ⊕ NEW MEETING ∨ · ⊕ JOIN MEETING · ⊕ SCHEDULE · ⊕ SHARE SCREEN

| TERM | VALUE |
|---|---|
| REGRET | -2 |
| INDIFFERENT | -2 |
| DISAPPOINTS | -2 |
| DOUBTS | -1 |
| OUTMANEUVERED | -2 |

FIG. 6

SENTIMENT SCORING FOR REMOTE COMMUNICATION SESSIONS

FIELD OF INVENTION

The present invention relates generally to digital communication, and more particularly, to systems and methods for presenting sentiment scores within a communication session.

SUMMARY

The appended claims may serve as a summary of this application.

BRIEF DESCRIPTION OF THE DRAWINGS

The present invention relates generally to digital communication, and more particularly, to systems and methods providing for presenting sentiment scores within a communication session.

The present disclosure will become better understood from the detailed description and the drawings, wherein:

FIG. 4 is a diagram illustrating one example embodiment of a user interface for presenting sentiment scores for recorded conversations.

FIG. 5 is a diagram illustrating one example embodiment of a user interface for presenting a sentiment score for a conversation.

FIG. 6 is a diagram illustrating examples of polarity scores applied to words for purposes of sentiment analysis.

DETAILED DESCRIPTION

Figure 1A:
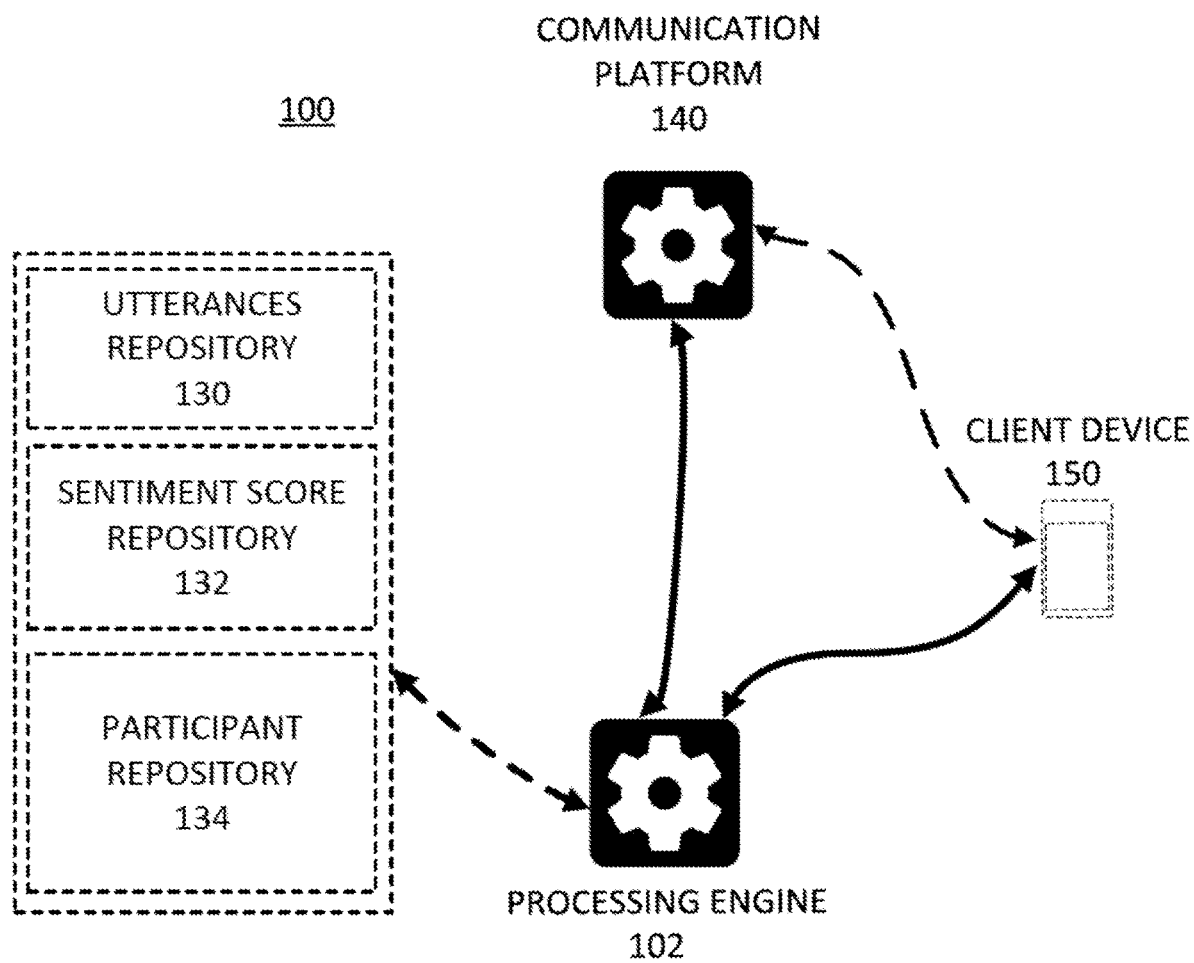
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote communication sessions, a large amount of important work for organizations gets conducted through them in various ways. For example, a large portion or even the entirety of sales meetings, including pitches to prospective clients and customers, may be conducted during remote communication sessions rather than in-person meetings. Sales teams will often dissect and analyze such sales meetings with prospective customers after they are conducted. Because sales meetings may be recorded, it is often common for a sales team to share meeting recordings between team members in order to analyze and discuss how the team can improve their sales presentation skills.

Such techniques are educational and useful, and can lead to drastically improved sales performance results for a sales team. However, such recordings of meetings simply include the content of the meeting, and the communications platforms which host the meetings do not provide the sorts of post-meeting, or potentially in-meeting, intelligence and analytics that such a sales team would find highly relevant and useful to their needs.

One such use case which is currently lacking includes analytics data and metrics around analysis of the sentiment of one or more participants within a conversation in a communication session, such as the sentiment of a prospective customer. Such a sentiment analysis can provide a sentiment score for the customer representing their feeling or sentiment during the sales meeting, based on a positive sentiment, negative sentiment, or a neutral sentiment. It would be highly valuable for sales representatives within a sales team, for example, to learn about the sentiment of a prospective customer overall for a conversation, or during specific segments focused on certain topics, in order to understand customer sentiment and behavior better overall or for specific topics, and to formulate strategies for improving prospective customer sentiment in areas where it is negative.

Thus, there is a need in the field of digital communication tools and platforms to create a new and useful system and method for sentiment scoring within a communication session. The source of the problem, as discovered by the inventors, is a lack of useful meeting intelligence and analytics data provided to members of an organization with respect to remote communication sessions.

In one embodiment, the system connects to a communication session with a number of participants; receives a transcript of a conversation between the participants produced during the communication session; extracts, from the transcript, utterances including one or more sentences spoken by the participants; identifies a subset of the utterances spoken by a subset of the participants associated with a prespecified organization; for each utterance, determines a word sentiment score for each word in the utterance, and determines an utterance sentiment score based on the word sentiment scores; determines an overall sentiment score for the conversation based on the utterance sentiment scores; and presenting, to one or more client devices, at least the overall sentiment score for the conversation.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., an utterances repository 130, sentiment score repository 132, and/or a participant repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
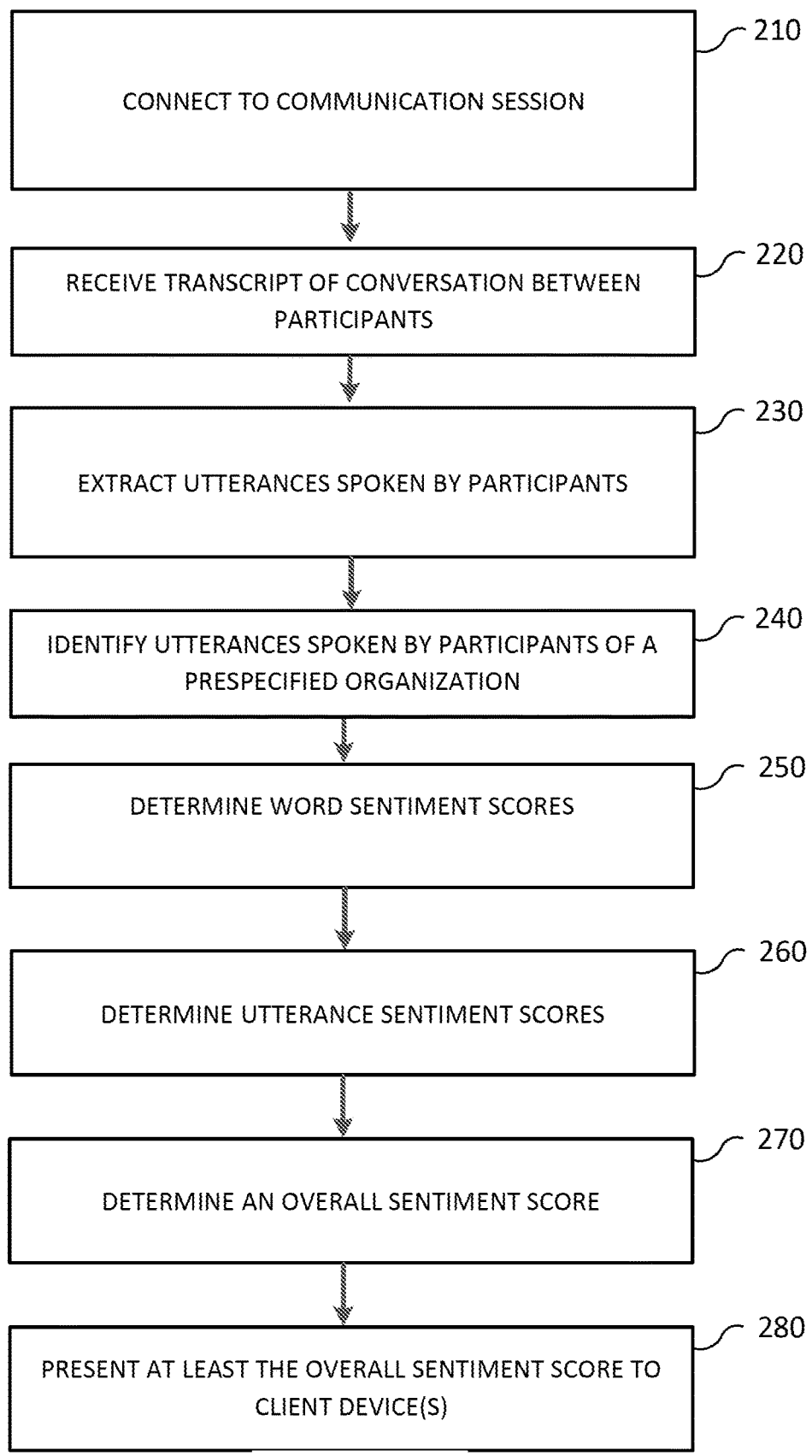
FIG. 2 is a flow chart illustrating an exemplary method that may be performed in some embodiments.

In an embodiment, the processing engine 102 may perform the exemplary method of FIG. 2 or other method herein and, as a result, extract sentiment scores from a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include an utterances repository 130, sentiment score repository 132, and/or participant repository 134. The optional repositories function to store and/or maintain, respectively, information on utterances within the session; sentiment scores which are calculated; and information relating to participants within the session. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
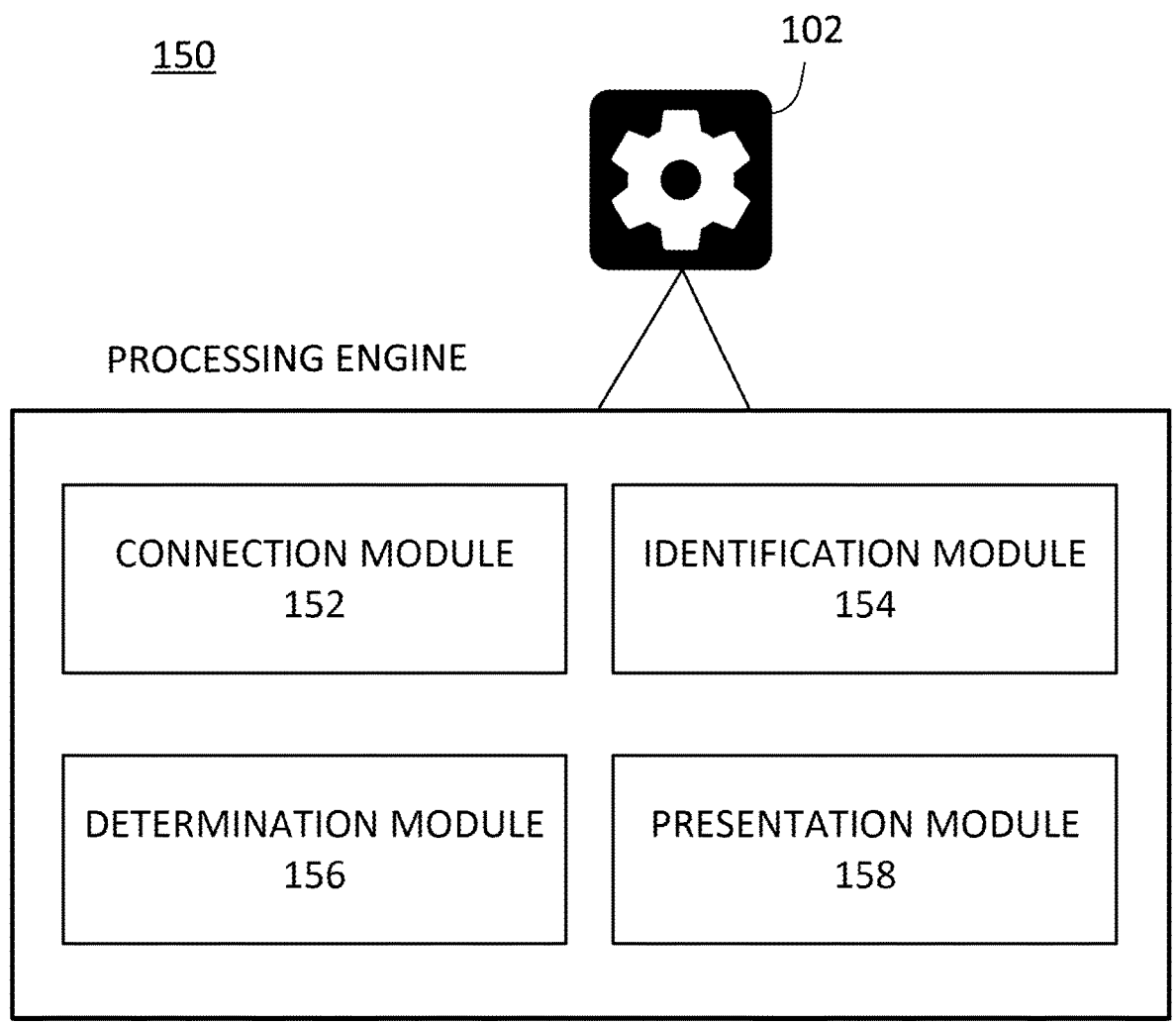
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Connection module 152 functions to connect to a communication session with a number of participants, and receive a transcript of a conversation between the participants produced during the communication session.

Identification module 154 functions to extract, from the transcript, a plurality of utterances each including one or more sentences spoken by the participants, and identify a subset of the utterances spoken by a subset of the participants associated with a prespecified organization.

Determination module 156 functions to determine a word sentiment score for each word in each utterance, determine an utterance sentiment score based on the word sentiment scores, and determine an overall sentiment score for the conversation.

Presentation module 158 functions to present, for display on one or more client devices, at least the overall sentiment score for the conversation.

The above modules and their functions will be described in further detail in relation to an exemplary method below.

FIG. 2 is a flow chart illustrating an exemplary method that may be performed in some embodiments.

At step 210, the system connects to a communication session (e.g., a remote video session, audio session, chat session, or any other suitable communication session) having a number of participants. In some embodiments, the communication session can be hosted or maintained on a communication platform, which the system maintains a connection to in order to connect to the communication session. In some embodiments, the system displays a UI for each of the participants in the communication session. The UI can include one or more participant windows or participant elements corresponding to video feeds, audio feeds, chat messages, or other aspects of communication from participants to other participants within the communication session.

At step 220, the system receives a transcript of a conversation between the participants produced during the communication session. That is, the conversation which was produced during the communication is used to generate a transcript. The transcript is either generated and received by different parts of the system, or is generated outside of the system and retrieved by the system for use in the present systems and methods. In some embodiments, the transcript is textual in nature. In some embodiments, the transcript includes a number of utterances, which are composed of one or more sentences attached to a specific speaker of that sentence (i.e., participant). Timestamps may be attached to each utterance and/or each sentence. In some embodiments, the transcript is generated in real-time while the communication session is underway, and is presented after the meeting has terminated. In other embodiments, the transcript in generated in real-time during the session and also presented in real-time during the session.

At step 230, the system extracts utterances spoken by the participants. Utterances are recognized by the system as one or more sentences attached to a specific speaker of that sentence (i.e., participant). Timestamps, as well as a speaker who uttered the utterance, may be attached to each utterance and/or each sentence. In some embodiments, the transcript itself provides clear demarcation of utterances based on the timestamps which are placed at the start of each utterance. Thus, extracting these utterances may involve extracting the separate utterances which have been demarcated by the timestamps in the transcript.

At step 240, the system identifies a subset of the utterances spoken by a subset of the participants associated with a prespecified organization. In some embodiments, the prespecified organization may be a business entity or company, department, team, organization, or any other suitable organization. In some embodiments, team members may identify themselves and/or one another as members, employees, contractors, or otherwise associated with the organization. In some embodiments, hierarchical relationships between users associated with the organization can be formed due to users explicitly providing such information, via the system implicitly drawing connections based on additional information, or some combination thereof. In some embodiments, a reporting chain of command can be established based on such implicit or explicit hierarchical relationships. In some embodiments, the system identifies that the participant is part of the organization upon the participant logging into the communication platform. In some embodiments, if the domain of the email address associated with the participant is the same email domain as a known member of an organization, they may be presumed to be associated with the organization as well. In some embodiments, within the context of a sales meeting involving sales representatives and prospective customers, the system can use organizational data to determine which participants are sales representatives and which participants are customers.

At step 250, the system determines word sentiment scores for each word in each utterance. Sentiment analysis techniques are used in determining the word sentiment scores. Sentiment analysis is a technique through which a piece of text can be analyzed to determine the sentiment behind it. Using sentiment analysis, a program can understand if the sentiment behind a piece of text is, e.g., positive, negative, or neutral. At least one input to the sentiment analysis model being used is the transcript for the communication session, which contains a list of utterances from participants, as well as timing and participant information related to those utterances. In some embodiments, an additional input to the sentiment analysis model can be an output from a different model which can provide one or more groups of sentences or utterances, which are grouped according to sentences which belong to the same topic segment. In some embodiments, the segment scores are used to determine the polarity of each segment in the conversation. There are typically several sentences within each segment, and these sentences within the segment can be processed and summarized to provide a polarity (i.e., positive, negative, or neutral) for the segment.

In some embodiments, a lexicon-based model of sentiment analysis is used for sentiment scoring. In these embodiments, the system identifies, via a lexicon consisting of a multitude of words with a polarity (i.e., valence) associated with each word. The lexicon of words may be an open source lexicon. In some embodiments, the lexicon may be a sentiment lexicon or other suitable lexicon for such purposes. Words are thus compared against a labeled word list (i.e., lexicon), where each word has been scored for valence. A word sentiment score for each word is then calculated based on the predefined score corresponding to each word. In some embodiments, the polarity of a word may vary from −5 (most negative) to +5 (most positive). In such a model where a lexicon is used, no training of the model for the task is necessary. An example of some words and their polarities within a lexicon is illustrated in FIG. 6, described below.

At step 260, the system determines an utterance sentiment score for each utterance based on the word sentiment scores. In some embodiments, the system determines an utterance sentiment score for each utterance using the average score of the word sentiment scores within the utterance.

In some embodiments, the system may employ a model which uses pre-trained word embedding focusing on each utterance. The system would use pre-trained text embedding to create utterance sentiment analysis. In some embodiments, the system would additionally use annotated data for fine tuning. Annotated data and customer feedback may be used as training data.

In some embodiments, the system may use a simple machine learning model to obtain the sentiment score for each utterance. A simple model may achieve fast inference, for example, because it does not take into account context within a sentence.

In some other embodiments, the system may use a context-aware pre-trained model, with pre-trained embedding. This may be slower in some cases than a more simpler model.

In some embodiments, a longer-term text-based model is employed based on, e.g., conversation flow and/or multimodality models. The system may have access to more annotated data, for example, and/or access to multiple sources of data, allowing the system to employ more complicated models. For example, in some embodiments a model may focus not just on each utterance, but on the relationships between different utterances. In some embodiments, the model may focus on multiple sources of information, such as multiple voice or video modalities.

At step 270, the system determines an overall sentiment score for the conversation based on the utterance sentiment scores. In some embodiments, the overall sentiment score is calculated as the average score of all the sentences in the transcript weighted by the sentence length. In some embodiments, the overall sentiment score represents the first level of opinion mining or sentiment analysis based on the whole conversation. In this particular level, the whole transcript is taken into consideration and used to determine the polarity of the conversation (i.e., positive, negative, or neutral).t In some embodiments, the system receives a number of topic segments for the conversation and respective timestamps for the topic segments. This may be the output of one or more algorithms configured to provide automatic segmentation of conversations into a number of topic segments. For each topic segment in the conversation, the system determines a topic segment score for each topic segment. Each topic segment consists of a number of different utterances. The topic segment score is a weighted average based on the length of each utterance. The system then additionally presents, to the one or more client devices, the topic segment scores for each topic segment in the conversation.

In some embodiments, the overall sentiment score and one or more other sentiment scores undergo a scaling function, so that the scores are, e.g., between 0 and 100 for easier readability and presentation to end users receiving such data. In some embodiments, the distribution of the scores is changed so that not all scores are concentrated within a narrow distribution.

In one embodiment, for example, the scaling can be performed as such:
1. [−0.2, 0] scaled to [0 to 50], [0, 0.64] scaled to [50, 100]
2. value <−0.2 mapped to 0, value >0.64, mapped to 100
3. outliers (e.g., duration smaller than 5 min, less than 10 words) mapped to 50

At step 280, the system presents, to one or more client devices, at least the overall sentiment score for the conversation, as will be described further with respect to FIG. 2.

In some embodiments, the data is displayed at one or more client devices which are configured to display a UI related to the communication platform and/or communication session. In various embodiments, the one or more client devices may be, e.g., one or more desktop computers, smartphones, laptops, tablets, headsets or other wearable devices configured for virtual reality (VR), augmented reality (AR), or mixed reality, or any other suitable client device for displaying such a UI.

In various embodiments, the client devices may be associated with and/or operated by one or more of: one or more participants of the communication session associated with the organization, one or more administrators or hosts of the communication session, one or more users within an organizational reporting chain of participants of the communication session, and/or one or more authorized users within the organization. In some embodiments, users may be authorized for their client devices to receive a UI presenting data on extracted sentiment scores if they are granted permission to access, view, and/or modify such data. In some embodiments, a UI for permissions control may be presented to one or more hosts, administrators, or authorized individuals which allows them to customize a number of settings for providing permissions to users with respect to such data. For example, a user authorized to manage permissions controls for a communication session, or all communication sessions for a particular organization, may be able to add participants, remove participants, add, remove, or modify the particular data or types of data which will be presented for such a session, and more.

Figure 3:
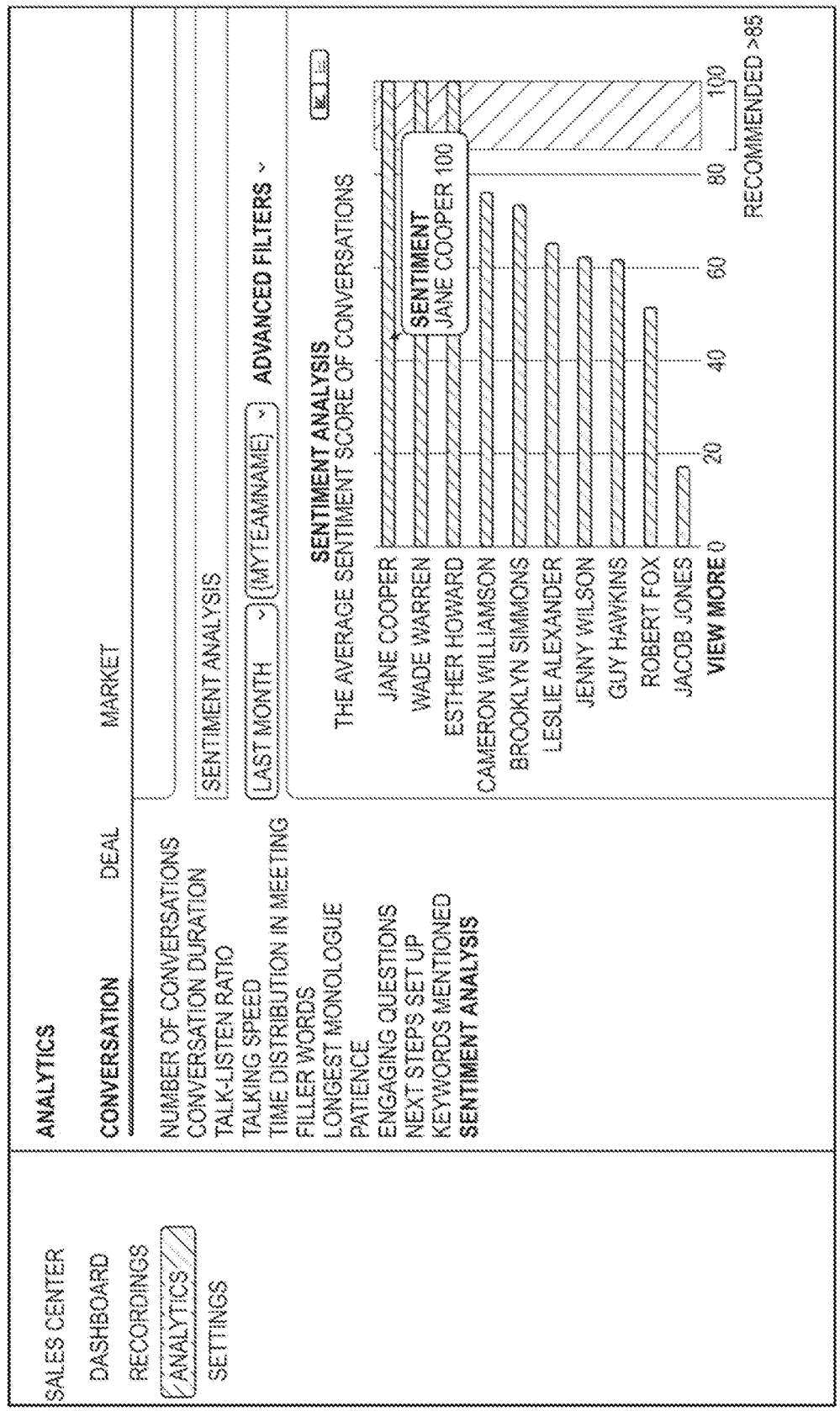
FIG. 3 is a diagram illustrating one example embodiment of a user interface for presenting data related to extracted engaging questions.

Within this displayed UI presented to the one or more client devices, data corresponding to the extracted sentiment scores can be displayed. For example, a UI may be shown which displays aggregate analytics data pertaining to a sales team's meetings with clients over multiple conversations and communication sessions. Within this aggregate analytics data, average sentiment scores across conversations can be displayed with respect to the entire team's performance. In some embodiments, data on average sentiment scores during conversations is additionally or alternatively displayed for each individual member of a group. An example of such a UI displayed to client device(s) is illustrated in FIG. 3 and described in further detail below. In some embodiments, rather than aggregate analytics data or data shown for all team members, individual and/or customized analytics data for a particular participant can be viewed, including potentially a wide variety of data for that particular individual.

In some embodiments, the displayed UI may additionally or alternatively present one or more windows which present data with respect to an individual recording, such as the most recent conversation or a currently-in-progress conversation produced in a single given communication session. Users may be able to access a playback recording of the communication session, as well as see various pieces of data with respect to the communication session. In some embodiments, users may be able to view a transcript related to the conversation produced, and instruct the UI to display the detected sentiment within the transcript in a highlighted or similar fashion. An example of such a UI is illustrated in FIG. 4, described in further detail below. In some embodiments, a UI element with a playback recording may present one or more pieces of aggregate analytics data or individual analytics data corresponding to the communication session as a whole, the particular topic segment the user is playing back, or any other suitable data which can be presented. An example of such a UI element is illustrated in FIG. 6, described in further detail below.

FIG. 3 is a diagram illustrating one example embodiment of a user interface ("UI") for presenting data related to extracted engaging questions.

Within the illustrated UI, an analytics tab is presented at a display of a client device. A "Conversation" sub-tab is displayed with a number of analytics and metrics related to an aggregate of multiple conversations which participants have participated in within communication sessions for a sales team. One of the analytics elements which can be further navigated to is labeled "Sentiment Analysis", which is currently selected for display within the UI window. This set of analytics data shown includes per-participant information on the average sentiment scores of conversations.

In the example, Jane Cooper, Wade Warren, and Esther Howard have all participated in conversations that have an average sentiment score of 100, meaning prospective customers have all felt highly positive about the conversations. On the low end, Jacob Jones has participated in conversations that have an average sentiment score of under 20, meaning prospective customers have all felt highly negative about the conversations. A recommended average sentiment score of over 85 is additionally presented.

Additionally, filters appear above the data which allow for filtering conversations based on time and team. In this example, conversations from last month are included in the time filter, while the participant's team name is used for the team for which analytics data is displayed. Additional advanced filters may be applied via a drop down box UI element, if desired.

FIG. 4 is a diagram illustrating one example embodiment of a user interface for presenting sentiment scores for recorded conversations.

Figure 5:
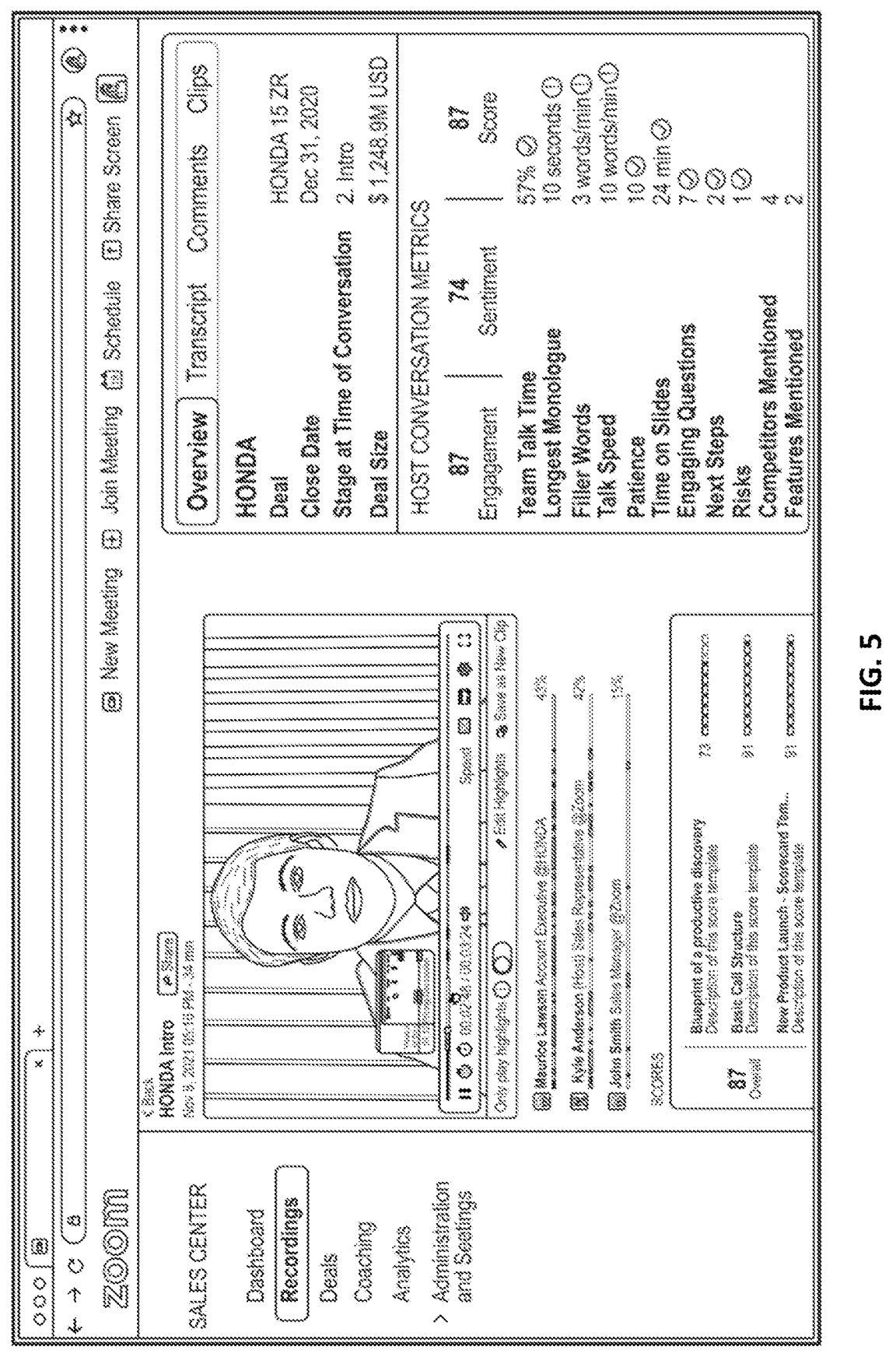

FIG. 5 is a diagram illustrating one example embodiment of a user interface for presenting a sentiment score for a conversation.

Within the illustrated UI, a "Recordings" tab is presented at a display of a client device. Information about a specific recording of a communication session is displayed, including a video of the recording itself which can be played back in various ways or adjusted to skip to different times or topics within the video. A timeline allows the user to skip to different topic, and when the user hovers over a topic, a timestamp as well as a topic segment name is displayed.

On the right side of the window, a number of aggregate analytics data and/or metrics for the entire sales team are displayed with respect to the one, specific recording and communication session, including a "Sentiment" metric for the entire team. The Sentiment metric shows the data for the entire team in terms of sentiment, which in this example is 3 words per minute. Next to this data, an icon with an exclamation mark is displayed, indicating that this sentiment is either outside of or in danger of falling outside of a recommended sentiment. In some embodiments, the recommended number is predetermined and fixed, while in other embodiments, the recommended number may be based on one or more recommendation criteria, such as the past performance of the team, recommended performances for the industry, an aggregate recommended performance for the combination of participants involved based on individual participant recommended performances, or any other such suitable criteria for generating a recommended figure for the metric.

Directly below the video playback UI element, a list of participants is shown for a particular topic segment, with data relating to each. The information presented for each participant, as well as the order of participants, may change based on the topic segment currently being played or currently skipped to. In some embodiments, a user may be able to click on his own name from this list, or potentially other participants, to receive individualized and/or customized analytics data pertaining to him or her in particular. For example, the sentiment score across conversations for just that participant may be displayed, or both the individual data for that participant as well as the aggregate data so that the participant can compare their own performance with respect to the total sales team involved in the conversation.

In some embodiments, this UI for the recording may additionally or alternatively show such metrics, including the "Sentiment" individual or aggregate data, for a particular topic within the conversation, depending on where in the video recording the participant has skipped to or is currently playing back. For example, if the user skips to timestamp 04:12 in the recording, which is labeled with topic segment "Pricing Discussion", then the UI may additionally or alternatively show the sentiment score that is calculated for that topic segment alone. In this way, users, e.g., sales teams and their individual sales representatives, can view analytics data on their performance for each individual topic, not just as a whole for the recording or across multiple conversations.

FIG. 6 is a diagram illustrating examples of polarity scores applied to words for purposes of sentiment analysis.

In the example, "regret", "indifferent", "disappoints", and "outmaneuvered" all have valences or polarity scores of −2, representing very negative polarity for those words. "Doubts", meanwhile, has a polarity score of −1, representing a negative polarity for that word. In some embodiments, the valence of a sentence may range from −5 (most negative) to +5 (most positive), while in some other embodiments the valence may range from 1 to 5. For example, a valence of 1 may represent a very negative valence in which the speaker is angry, sad, and/or extremely unsatisfied. A valence of 2 may represent a negative valence in which the speaker is frowning, sighing, or unsatisfied. A valence of 3 may represent a neutral valence in which the speaker speaks in a monotone voice, and/or may be discussing business or technical details. A valence of 4 may represent a positive valence in which the speaker smiles before or after the utterance, and is happy or satisfied. A valence of 5 may represent a a very positive valence in which the speaker laughs before or after the utterance, and is very happy or extremely satisfied.

Figure 7:
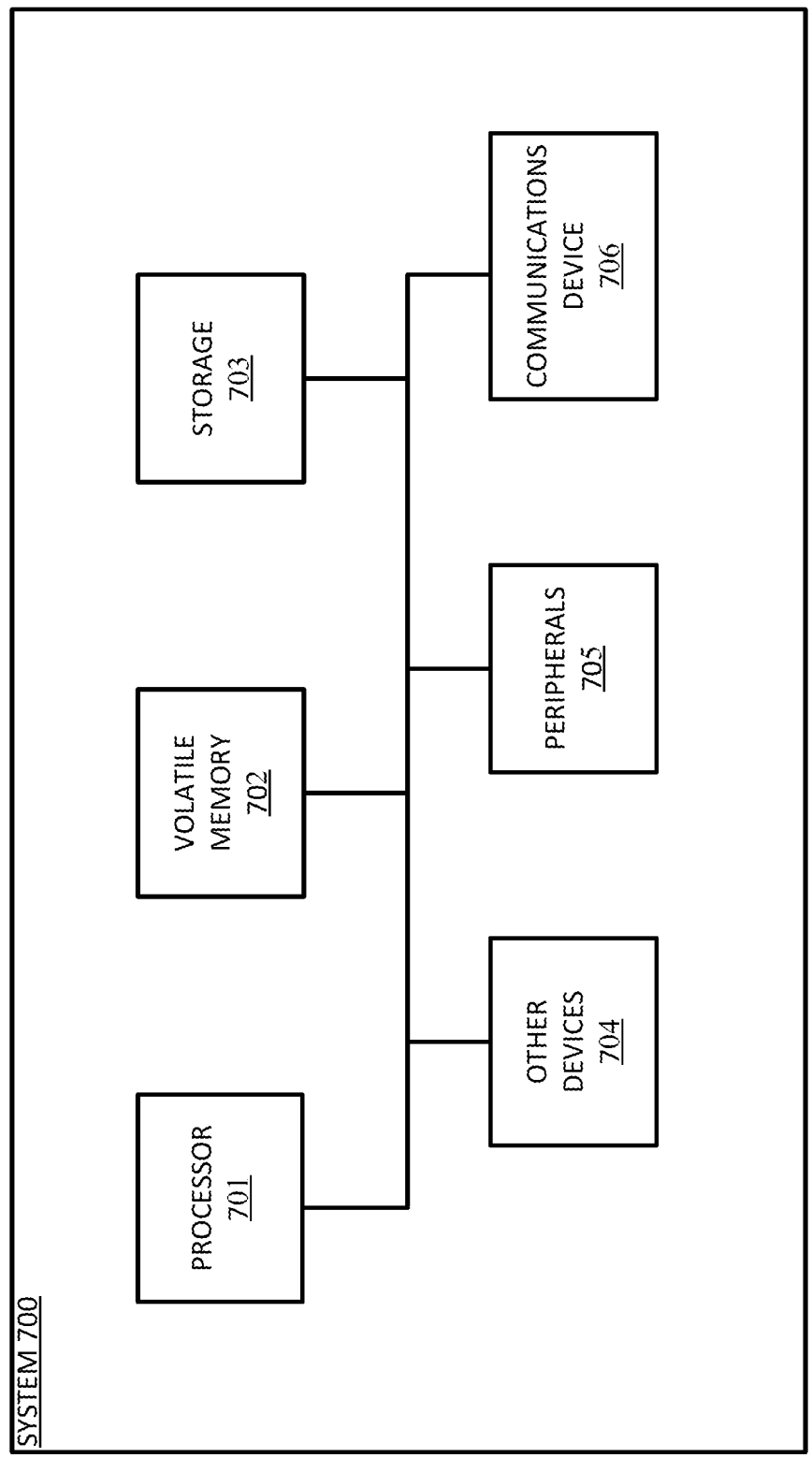
FIG. 7 is a diagram illustrating an exemplary computer that may perform processing in some embodiments.

FIG. 7 is a diagram illustrating an exemplary computer that may perform processing in some embodiments. Exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 100 to an external medium. For example, communications device 706 may take the form of a network adapter that provides communications to a network. A computer 700 may also include a variety of other devices 704. The various components of the computer 700 may be connected by a connection medium such as a bus, crossbar, or network.

It will be appreciated that the present disclosure may include any one and up to all of the following examples.

Example 1. A method comprising: connecting to a communication session with a plurality of participants; receiving a transcript of a conversation between the participants produced during the communication session; extracting, from the transcript, a plurality of utterances comprising one or more sentences spoken by the participants; identifying a subset of the plurality of utterances spoken by a subset of the participants associated with a prespecified organization; for each utterance in the plurality of utterances: determining a word sentiment score for each word in the utterance, and determining an utterance sentiment score based on the word sentiment scores; determining an overall sentiment score for the conversation based on the utterance sentiment scores; and presenting, to one or more client devices, at least the overall sentiment score for the conversation.

Example 2. The method of example 1, wherein determining the word sentiment score for each word in the utterance comprises: identifying, via a lexicon, a predefined score corresponding to each word.

Example 3. The method of any of example 1 or example 2, further comprising: receiving a plurality of topic segments for the conversation and respective timestamps for the topic segments; for each topic segment in the conversation, determining a topic segment score for each topic segment; additionally presenting, to the one or more client devices, the topic segment scores for each topic segment in the conversation.

Example 4. The method of example 3, wherein determining the topic segment score for each topic segment comprises: calculating a length of each sentence within the topic segment; determining an average score of all the sentences within the topic segment weighted by the sentence length.

Example 5. The method of any of examples 1-4, wherein determining an overall sentiment score for the conversation comprises: calculating a length of each sentence within the topic segment; determining an average score of all the sentences within the conversation weighted by the sentence length.

Example 6. The method of any of examples 1-5, further comprising: scaling the overall sentiment score prior to presentation to the one or more client devices.

Example 7. The method of any of examples 1-6, wherein the sentiment scores are based on at least one or more of: a positive sentiment, a negative sentiment, and a neutral sentiment.

Example 8. The method of any of examples 1-7, wherein the overall sentiment score is a Gaussian distribution.

Example 9. The method of any of examples 1-8, further comprising: receiving annotation data on the conversation comprising annotated sentiment score data, where one or more sentiment scores are calculated based at least in part on the annotation data.

Example 10. The method of any of examples 1-9, wherein: the transcript is received in real time while the communication session is underway, and one or more of the sentiment scores are presented in real time to the one or more client devices while the communication session is underway.

Example 11. The method of any of examples 1-10, further comprising: training one or more artificial intelligence (AI) models to determine one or more of the sentiment scores in the communication session, wherein determining the one or more sentiment scores is performed by the one or more AI models.

Example 12. The method of any of examples 1-11, wherein the transcript of the conversation is generated via one or more automatic speech recognition (ASR) techniques.

Example 13. The method of any of examples 1-12, wherein: the communication session is a sales session with one or more prospective customers, the prespecified organization is a sales team, and the presented overall sentiment score relates to a sentiment of the one or more prospective customers.

Example 14. The method of any of examples 1-13, wherein the one or more client devices presented with the data are one or more of: one or more participants of the communication session associated with the organization, one or more administrators or hosts of the communication session, one or more users within an organizational reporting chain of participants of the communication session, and/or one or more authorized users within the organization.

Example 15. The method of any of examples 1-14, wherein determining the word sentiment score for each word in the utterance comprises: identifying, via a lexicon, a predefined score corresponding to each word.

Example 16. The method of any of examples 1-15, further comprising: receiving a plurality of topic segments for the conversation and respective timestamps for the topic segments; for each topic segment in the conversation, determining a topic segment score for each topic segment; additionally presenting, to the one or more client devices, the topic segment scores for each topic segment in the conversation.

Example 17. The method of example 16, wherein determining the topic segment score for each topic segment comprises: calculating a length of each sentence within the topic segment; determining an average score of all the sentences within the topic segment weighted by the sentence length.

Example 18. The method of any of examples 1-17, wherein determining an overall sentiment score for the conversation comprises: calculating a length of each sentence within the topic segment; determining an average score of all the sentences within the conversation weighted by the sentence length.

Example 19. A communication system comprising one or more processors configured to perform the operations of: connecting to a communication session with a plurality of participants; receiving a transcript of a conversation between the participants produced during the communication session; extracting, from the transcript, a plurality of utterances comprising one or more sentences spoken by the participants; identifying a subset of the plurality of utterances spoken by a subset of the participants associated with a prespecified organization; for each utterance in the plurality of utterances: determining a word sentiment score for each word in the utterance, and determining an utterance sentiment score based on the word sentiment scores; determining an overall sentiment score for the conversation based on the utterance sentiment scores; and presenting, to one or more client devices, at least the overall sentiment score for the conversation.

Example 20. The communication system of example 19, wherein determining the word sentiment score for each word in the utterance comprises: identifying, via a lexicon, a predefined score corresponding to each word.

Example 21. The communication system of any of examples 19 or 20, wherein the one or more processors are further configured to perform the operations of: receiving a plurality of topic segments for the conversation and respective timestamps for the topic segments; for each topic segment in the conversation, determining a topic segment score for each topic segment; additionally presenting, to the one or more client devices, the topic segment scores for each topic segment in the conversation.

Example 22. The communication system of example 21, wherein determining the topic segment score for each topic segment comprises: calculating a length of each sentence within the topic segment; determining an average score of all the sentences within the topic segment weighted by the sentence length.

Example 23. The communication system of any of examples 19-22, wherein determining an overall sentiment score for the conversation comprises: calculating a length of each sentence within the topic segment; determining an average score of all the sentences within the conversation weighted by the sentence length.

Example 24. The communication system of any of examples 19-23, wherein determining the word sentiment score for each word in the utterance comprises: identifying, via a lexicon, a predefined score corresponding to each word.

Example 25. The communication system of any of examples 19-24, wherein the one or more processors are further configured to perform the operations of: receiving a plurality of topic segments for the conversation and respective timestamps for the topic segments; for each topic segment in the conversation, determining a topic segment score for each topic segment; additionally presenting, to the one or more client devices, the topic segment scores for each topic segment in the conversation.

Example 26. The communication system of example 25, wherein determining the topic segment score for each topic segment comprises: calculating a length of each sentence within the topic segment; determining an average score of all the sentences within the topic segment weighted by the sentence length.

Example 27. The communication system of any of examples 19-26, wherein determining an overall sentiment score for the conversation comprises: calculating a length of each sentence within the topic segment; determining an average score of all the sentences within the conversation weighted by the sentence length.

Example 28. The communication system of any of examples 19-27, wherein the one or more processors are further configured to perform the operations of: scaling the overall sentiment score prior to presentation to the one or more client devices.

Example 29. The communication system of any of examples 19-28, wherein the sentiment scores are based on at least one or more of: a positive sentiment, a negative sentiment, and a neutral sentiment.

Example 30. The communication system of any of examples 19-29, wherein the overall sentiment score is a Gaussian distribution.

Example 31. The communication system of any of examples 19-30, wherein the one or more processors are further configured to perform the operations of: receiving annotation data on the conversation comprising annotated sentiment score data, where one or more sentiment scores are calculated based at least in part on the annotation data.

Example 32. The communication system of any of examples 19-31, wherein: the transcript is received in real time while the communication session is underway, and one or more of the sentiment scores are presented in real time to the one or more client devices while the communication session is underway.

Example 33. The communication system of any of examples 19-32, wherein the one or more processors are further configured to perform the operations of: training one or more artificial intelligence (AI) models to determine one or more of the sentiment scores in the communication session, wherein determining the one or more sentiment scores is performed by the one or more AI models.

Example 34. The communication system of any of examples 19-33, wherein the transcript of the conversation is generated via one or more automatic speech recognition (ASR) techniques.

Example 35. The communication system of any of examples 19-34, wherein: the communication session is a sales session with one or more prospective customers, the prespecified organization is a sales team, and the presented overall sentiment score relates to a sentiment of the one or more prospective customers.

Example 36. The communication system of any of examples 19-35, wherein the one or more client devices presented with the data are one or more of: one or more participants of the communication session associated with the organization, one or more administrators or hosts of the communication session, one or more users within an organizational reporting chain of participants of the communication session, and/or one or more authorized users within the organization.

Example 37. A non-transitory computer-readable medium containing instructions for generating a note with session content from a communication session, comprising: instructions for connecting to a communication session with a plurality of participants; instructions for receiving a transcript of a conversation between the participants produced during the communication session; instructions for extracting, from the transcript, a plurality of utterances comprising one or more sentences spoken by the participants; instructions for identifying a subset of the plurality of utterances spoken by a subset of the participants associated with a prespecified organization; for each utterance in the plurality of utterances: instructions for determining a word sentiment score for each word in the utterance, and instructions for determining an utterance sentiment score based on the word sentiment scores; instructions for determining an overall sentiment score for the conversation based on the utterance sentiment scores; and instructions for presenting, to one or more client devices, at least the overall sentiment score for the conversation.

Example 38. The non-transitory computer-readable medium of example 37, wherein determining the word sentiment score for each word in the utterance comprises: identifying, via a lexicon, a predefined score corresponding to each word.

Example 39. The non-transitory computer-readable medium of any of examples 37 or 38, further comprising: instructions for receiving a plurality of topic segments for the conversation and respective timestamps for the topic segments; for each topic segment in the conversation, instructions for determining a topic segment score for each topic segment; instructions for additionally presenting, to the one or more client devices, the topic segment scores for each topic segment in the conversation.

Example 40. The non-transitory computer-readable medium of any of examples 37-39, wherein determining the topic segment score for each topic segment comprises: instructions for calculating a length of each sentence within the topic segment; instructions for determining an average score of all the sentences within the topic segment weighted by the sentence length.

Example 41. The non-transitory computer-readable medium of any of examples 37-40, wherein determining an overall sentiment score for the conversation comprises: instructions for calculating a length of each sentence within the topic segment; instructions for determining an average score of all the sentences within the conversation weighted by the sentence length.

Example 42. The non-transitory computer-readable medium of any of examples 37-41, wherein determining the word sentiment score for each word in the utterance comprises: instructions for identifying, via a lexicon, a predefined score corresponding to each word.

Example 43. The non-transitory computer-readable medium of any of examples 37-42, further comprising:

instructions for receiving a plurality of topic segments for the conversation and respective timestamps for the topic segments; for each topic segment in the conversation, instructions for determining a topic segment score for each topic segment; instructions for additionally presenting, to the one or more client devices, the topic segment scores for each topic segment in the conversation.

Example 44. The non-transitory computer-readable medium of example 43, wherein determining the topic segment score for each topic segment comprises: instructions for calculating a length of each sentence within the topic segment; instructions for determining an average score of all the sentences within the topic segment weighted by the sentence length.

Example 45. The non-transitory computer-readable medium of any of examples 37-44, wherein determining an overall sentiment score for the conversation comprises: instructions for calculating a length of each sentence within the topic segment; instructions for determining an average score of all the sentences within the conversation weighted by the sentence length.

Example 46. The non-transitory computer-readable medium of any of examples 37-45, further comprising: instructions for scaling the overall sentiment score prior to presentation to the one or more client devices.

Example 47. The non-transitory computer-readable medium of any of examples 37-46, wherein the sentiment scores are based on at least one or more of: a positive sentiment, a negative sentiment, and a neutral sentiment.

Example 48. The non-transitory computer-readable medium of any of examples 37-47, wherein the overall sentiment score is a Gaussian distribution.

Example 49. The non-transitory computer-readable medium of any of examples 37-48, further comprising: instructions for receiving annotation data on the conversation comprising annotated sentiment score data, where one or more sentiment scores are calculated based at least in part on the annotation data.

Example 50. The non-transitory computer-readable medium of any of examples 37-49, wherein: the transcript is received in real time while the communication session is underway, and one or more of the sentiment scores are presented in real time to the one or more client devices while the communication session is underway.

Example 51. The non-transitory computer-readable medium of any of examples 37-50, further comprising: instructions for training one or more artificial intelligence (AI) models to determine one or more of the sentiment scores in the communication session, wherein determining the one or more sentiment scores is performed by the one or more AI models.

Example 52. The non-transitory computer-readable medium of any of examples 37-51, wherein the transcript of the conversation is generated via one or more automatic speech recognition (ASR) techniques.

Example 53. The non-transitory computer-readable medium of any of examples 37-52, wherein: the communication session is a sales session with one or more prospective customers, the prespecified organization is a sales team, and the presented overall sentiment score relates to a sentiment of the one or more prospective customers.

Example 54. The non-transitory computer-readable medium of any of examples 37-53, wherein the one or more client devices presented with the data are one or more of: one or more participants of the communication session associated with the organization, one or more administrators or hosts of the communication session, one or more users within an organizational reporting chain of participants of the communication session, and/or one or more authorized users within the organization.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
connecting to a communication session with a plurality of participants;
receiving a transcript of a conversation between the participants produced during the communication session;
extracting, from the transcript, a plurality of utterances comprising one or more sentences spoken by the participants;
identifying a subset of the plurality of utterances spoken by a subset of the participants associated with a prespecified organization;
for each utterance in the plurality of utterances:
determining a word sentiment score for each word in the utterance, and
determining an utterance sentiment score based on the word sentiment scores;
determining an overall sentiment score for the conversation based on the utterance sentiment scores; and
presenting, to one or more client devices, at least the overall sentiment score for the conversation.

2. The method of claim 1, wherein determining the word sentiment score for each word in each utterance comprises:
identifying, via a lexicon, a predefined score corresponding to each word.

3. The method of claim 1, further comprising:
receiving a plurality of topic segments for the conversation and respective timestamps for the topic segments;
for each topic segment in the conversation, determining a topic segment score for each topic segment; and
additionally presenting, to the one or more client devices, the topic segment scores for each topic segment in the conversation.

4. The method of claim 3, wherein determining the topic segment score for each topic segment comprises:
calculating a length of each sentence within the topic segment; and
determining an average score of all the sentences within the topic segment weighted by a sentence length.

5. The method of claim 3, wherein determining the overall sentiment score for the conversation comprises:
calculating a length of each sentence within the topic segment; and
determining an average score of all the sentences within the conversation weighted by a sentence length.

6. The method of claim 1, further comprising:
scaling the overall sentiment score prior to presentation to the one or more client devices.

7. The method of claim 1, wherein the utterance sentiment scores are based on at least one or more of: a positive sentiment, a negative sentiment, and a neutral sentiment.

8. The method of claim 1, wherein the overall sentiment score is a Gaussian distribution.

9. The method of claim 1, further comprising:
receiving annotation data on the conversation comprising annotated sentiment score data,
where one or more sentiment scores are calculated based at least in part on the annotation data.

10. The method of claim 1, wherein:
the transcript is received in real time while the communication session is underway, and
one or more of the utterance sentiment scores are presented in real time to the one or more client devices while the communication session is underway.

11. The method of claim 1, further comprising:
training one or more artificial intelligence (AI) models to determine one or more of the sentiment scores in the communication session,
wherein determining the one or more utterance sentiment scores is performed by the one or more AI models.

12. The method of claim 1, wherein the transcript of the conversation is generated via one or more automatic speech recognition (ASR) techniques.

13. The method of claim 1, wherein:
the communication session is a sales session with one or more prospective customers,
the prespecified organization is a sales team, and
the presented overall sentiment score relates to a sentiment of the one or more prospective customers.

14. The method of claim 1, wherein the one or more client devices are one or more of: one or more participants of the communication session associated with the prespecified organization, one or more administrators or hosts of the communication session, one or more users within an organizational reporting chain of participants of the communication session, and/or one or more authorized users within the prespecified organization.

15. A communication system comprising one or more processors configured to:
connect to a communication session with a plurality of participants;
receive a transcript of a conversation between the participants produced during the communication session;
extract, from the transcript, a plurality of utterances comprising one or more sentences spoken by the participants;
identify a subset of the plurality of utterances spoken by a subset of the participants associated with a prespecified organization;
for each utterance in the plurality of utterances:
determine a word sentiment score for each word in the utterance, and
determine an utterance sentiment score based on the word sentiment scores;
determine an overall sentiment score for the conversation based on the utterance sentiment scores; and
present, to one or more client devices, at least the overall sentiment score for the conversation.

16. The communication system of claim 15, wherein the one or more processors are configured to:
identify, via a lexicon, a predefined score corresponding to each word.

17. The communication system of claim 15, further comprising:
receive a plurality of topic segments for the conversation and respective timestamps for the topic segments;
for each topic segment in the conversation, determine a topic segment score for each topic segment; and
additionally present, to the one or more client devices, the topic segment scores for each topic segment in the conversation.

18. The communication system of claim 17, wherein the one or more processors are configured to:
- calculate a length of each sentence within the topic segment; and
- determine an average score of all the sentences within the topic segment weighted by a sentence length.

19. The communication system of claim 17, wherein the one or more processors are configured to:
- calculate a length of each sentence within the topic segment; and
- determine an average score of all the sentences within the conversation weighted by a sentence length.

20. A non-transitory computer-readable medium containing instructions for generating a note with session content from a communication session, comprising:
- instructions for connecting to a communication session with a plurality of participants;
- instructions for receiving a transcript of a conversation between the participants produced during the communication session;
- instructions for extracting, from the transcript, a plurality of utterances comprising one or more sentences spoken by the participants;
- instructions for identifying a subset of the plurality of utterances spoken by a subset of the participants associated with a prespecified organization;
- for each utterance in the plurality of utterances:
  - instructions for determining a word sentiment score for each word in the utterance, and
  - instructions for determining an utterance sentiment score based on the word sentiment scores;
- instructions for determining an overall sentiment score for the conversation based on the utterance sentiment scores; and
- instructions for presenting, to one or more client devices, at least the overall sentiment score for the conversation.

* * * * *